US010852420B2

(12) United States Patent
Chondro et al.

(10) Patent No.: US 10,852,420 B2
(45) Date of Patent: Dec. 1, 2020

(54) OBJECT DETECTION SYSTEM, AUTONOMOUS VEHICLE USING THE SAME, AND OBJECT DETECTION METHOD THEREOF

(71) Applicant: Industrial Technology Research Institute, Hsinchu (TW)

(72) Inventors: Peter Chondro, Hsinchu County (TW); Pei-Jung Liang, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 309 days.

(21) Appl. No.: 16/009,207

(22) Filed: Jun. 15, 2018

(65) Prior Publication Data
US 2019/0353774 A1 Nov. 21, 2019

Related U.S. Application Data

(60) Provisional application No. 62/673,131, filed on May 18, 2018.

(51) Int. Cl.
G01S 13/86 (2006.01)
G01S 13/931 (2020.01)
G01S 7/41 (2006.01)

(52) U.S. Cl.
CPC ............ G01S 13/867 (2013.01); G01S 7/414 (2013.01); G01S 13/931 (2013.01)

(58) Field of Classification Search
CPC ...................................... G01S 7/414
(Continued)

(56) References Cited

U.S. PATENT DOCUMENTS 8,199,046 B2 6/2012 Nanami
8,761,991 B1 * 6/2014 Ferguson ......... G08G 1/096725
701/28
(Continued)

FOREIGN PATENT DOCUMENTS

CN 107103276 8/2017
JP H09270014 10/1997
(Continued)

OTHER PUBLICATIONS

M. Aeberhard, S. Paul, N. Kaempchen and T. Bertram, "Object existence probability fusion using dempster-shafer theory in a high-level sensor data fusion architecture," 2011 IEEE Intelligent Vehicles Symposium (IV), Baden-Baden, 2011, pp. 770-775, doi: 10.1109/IVS.2011.5940430. (Year: 2011).*
(Continued)

Primary Examiner — Marcus E Windrich
(74) Attorney, Agent, or Firm — JCIPRNET

(57) ABSTRACT

In one of the exemplary embodiments, the disclosure is directed to an object detection system including a first type of sensor for generating a first sensor data; a second type of sensor for generating a second sensor data; and a processor coupled to the first type of sensor and the second type of sensor and configured at least for: processing the first sensor data by using a first plurality of object detection algorithms and processing the second sensor data by using a second plurality of object detection algorithms, wherein each of the first plurality of object detection algorithms and each of the second plurality of object detection algorithms include environmental parameters calculated from a plurality of parameter detection algorithms; and determining for each detected object a bounding box resulted from processing the first sensor data and processing the second sensor data.

16 Claims, 12 Drawing Sheets

(58) Field of Classification Search
USPC .................................................. 342/70–72
See application file for complete search history.

(56) References Cited

U.S. PATENT DOCUMENTS

| | | | |
|---|---|---|---|
| 8,818,609 B1* | 8/2014 | Boyko | B60W 30/00 701/28 |
| 8,983,705 B2 | 3/2015 | Zhu et al. | |
| 9,097,800 B1 | 8/2015 | Zhu | |
| 9,183,459 B1* | 11/2015 | Zhang | G06K 9/6293 |
| 9,221,396 B1* | 12/2015 | Zhu | G01S 7/40 |
| 10,671,068 B1* | 6/2020 | Xu | G05D 1/0212 |
| 2007/0046448 A1 | 3/2007 | Smitherman | |
| 2007/0286475 A1 | 12/2007 | Sekiguchi | |
| 2010/0164706 A1 | 7/2010 | Jeng et al. | |
| 2015/0234045 A1* | 8/2015 | Rosenblum | G01S 13/86 342/71 |
| 2015/0248591 A1 | 9/2015 | Shi et al. | |
| 2015/0346337 A1 | 12/2015 | Jung | |
| 2016/0104048 A1 | 4/2016 | Stein et al. | |
| 2016/0291149 A1 | 10/2016 | Zeng et al. | |
| 2017/0039435 A1 | 2/2017 | Ogale et al. | |
| 2017/0358102 A1 | 12/2017 | Akiyama | |
| 2018/0126984 A1 | 5/2018 | Liu et al. | |
| 2018/0349746 A1* | 12/2018 | Vallespi-Gonzalez | G01S 17/89 |
| 2019/0096086 A1* | 3/2019 | Xu | G06K 9/00791 |
| 2019/0120955 A1* | 4/2019 | Zhong | G01S 13/931 |
| 2019/0340775 A1* | 11/2019 | Lee | G01S 17/931 |
| 2020/0026283 A1* | 1/2020 | Barnes | G05D 1/0088 |

FOREIGN PATENT DOCUMENTS

| | | |
|---|---|---|
| JP | 2002099907 | 4/2002 |
| JP | 2010271788 | 12/2010 |
| JP | 2012048643 | 3/2012 |
| TW | I339627 | 4/2011 |
| TW | 201511997 | 4/2015 |
| TW | I615301 | 2/2018 |

OTHER PUBLICATIONS

"Office Action of Japan Counterpart Application," dated Oct. 29, 2019, p. 1-p. 4.

Noriko Shimomura et al., "A Method of Tracking a Forward Vehicle using a Scanning Laser Radar and a Camera", IEEJ Transactions on Electronics Information and Systems, No. 8, vol. 123, Aug. 2003, pp. 1-15.

Xinxin Du, et al., "Car detection for autonomous vehicle: LiDAR and vision fusion approach through deep learning framework," 2017 IEEE/RSJ International Conference on Intelligent Robots and Systems (IROS), Sep. 2017, pp. 749-754.

Bin Huang, et al., "Detection-Level Fusion for Multi-Object Perception in Dense Traffic Environment," 2017 IEEE International Conference on Multisensor Fusion and Integration for Intelligent Systems (MFI 2017), Nov. 2017, pp. 411-416.

Ping-Min Hsu, et al., "Object Detection and Recognition by Using Sensor Fusion," 2014 11th IEEE International Conference on Control & Automation (ICCA), Jun. 2014, pp. 56-60.

Ricardo Omar Chavez-Garcia, et al., "Multiple Sensor Fusion and Classification for Moving Object Detection and Tracking," IEEE Transactions on Intelligent Transportation Systems, vol. 17, No. 2, Feb. 2016, pp. 525-534.

Taehwan Kim, et al., "Comparative Analysis of RADAR-IR Sensor Fusion Methods for Object Detection," 2017 17th International Conference on Control, Automation and Systems (ICCAS 2017), Oct. 2017, pp. 1576-1580.

Hyunggi Cho, et al., "A Multi-Sensor Fusion System for Moving Object Detection and Tracking in Urban Driving Environments," 2014 IEEE International Conference on Robotics & Automation (ICRA), May 31-Jun. 7, 2014. pp. 1836-1843.

Shinpei Kato, et al., "An Open Approach to Autonomous Vehicles," IEEE Micro, Nov.-Dec. 2015, vol. 35, No. 6, pp. 60-68.

Alejandro Gonzalez, et al., "Pedestrian Detection at Day/Night Time with Visible and FIR Cameras: A Comparison," Sensors, vol. 16, No. 6, Jun. 2016, pp. 1-11.

Imran Ashraf, et al., "An Investigation of Interpolation Techniques to Generate 2D Intensity Image From LIDAR Data," IEEE Access, vol. 5, No. 1, May 2017, pp. 8250-8260.

Philip Sallis, et al., "Air Pollution and Fog Detection through Vehicular Sensors," 8th Asia Modelling Symposium, Sep. 2014, pp. 181-186.

Clemens Dannheim, et al., "Air pollution and fog detection through vehicular sensors," Library of Auckland University of Technology, 2015, pp. 01-6.

H. E. Hawkins, et al., "Radar Performance Degradation in Fog and Rain," IRE Transactions on Aeronautical and Navigational Electronics, vol. ANE-6, No. 1, Mar. 1959, pp. 26-30.

"Office Action of Taiwan Counterpart Application," dated Oct. 9, 2019, p. 1-p. 8.

* cited by examiner

OBJECT DETECTION SYSTEM, AUTONOMOUS VEHICLE USING THE SAME, AND OBJECT DETECTION METHOD THEREOF

CROSS-REFERENCE TO RELATED APPLICATION

This application claims the priority benefits of U.S. provisional application Ser. No. 62/673,131, filed on May 18, 2018. The entirety of the above-mentioned patent application is hereby incorporated by reference herein and made a part of this specification.

TECHNICAL FIELD

The disclosure is directed to an object detection system used by an autonomous vehicle, an autonomous vehicle using the same system, and an object detection method thereof.

BACKGROUND

Developments of autonomous vehicles have soared over the years because of factors including catalyzation of deep learning-based object detection algorithms and utilization of mobile yet powerful computing systems to implement the advanced technologies. Furthermore, the developments of imaging sensors that utilize more complex and accurate framework have enabled sensing techniques to go beyond passive-based technique as used in a camera into active-based techniques such as LiDAR and RaDAR transducers. These active sensors may also provide three-dimensional (3D) information by introducing depth information as compared to just two-dimensional (2D) information such as luminance and chrominance information from the camera sensors. In addition, various implementations have developed multi sensing technology to obtain comprehensive information from data fusion of different types of sensing devices in order to increase the accuracy of an object detection system.

Nevertheless, recent developments of different types of sensing devices as well as the performance of the prior state of the arts in object detection with multi sensing devices come with a few drawbacks. For instance, data qualities from each type of sensing devices for autonomous vehicles are influenced by both external and internal constraints. Any adverse constraint for the corresponding type of sensing device will reduce the data quality. Most of state of the arts that developed technology to fuse data from multi sensing devices have mostly considered internal constraints (objects' relative position, an objects' relative distance, a classifier's reliability, and etc.) exclusively. Some of the state of the arts that developed fusion technology for multi sensing devices have fused the information on the input level and utilized a single classifier to perform object detections. By doing so, the possibility for higher miss rates may increase.

In an autonomous vehicle, sensing devices disposed within the vehicle would be considered essential for obtaining accurate information of surrounding objects and conditions. Ideally, through implementations of a comprehensive variety and amount of sensor inputs acquired from different sensing modalities (i.e. different types of sensors), more reliable information could be procured as each sensing device may also verify information acquired from another sensing device.

The commonly used sensing devices for the development of the autonomous vehicles may include an imaging sensor, a light detection and ranging (LiDAR) transducer, and a radio detection and ranging (RaDAR) transducer. Each of these sensing devices possess sensing modalities which may retain characteristics and behaviors that either beneficially enhance sensory performances or adversely worsen sensory performances. Whether the sensory performances are enhanced or worsened would depend on certain circumstances and environments because of distinct principle of operation of each sensing device.

The principle of operation of an imaging sensor such as a RGB camera is to conduct imaging passively by receiving light information from external environment including light reflected from surrounding objects. In contrast, a LiDAR and a RaDAR are active transducers that rely upon at least a transmitter and a receiver to obtain information from the surrounding objects and environment. The difference between LiDAR and RaDAR is the spectrum of light being used (i.e. infrared vs. millimeter waves) which then determine the characteristic of the corresponding sensing modality. In particular, LiDAR would use modulated infrared (IR) wave to measure the time of flight between the transmitter and the receiver with a full-round (i.e. 360 degrees) field of view; whereas a RaDAR would use a radio frequency wave to measure the time of flight between the transmitter and the receiver with a field of view of a certain degree (e.g. less than 360 degrees).

Table 1 shows a comparison of characteristics among various sensing devices that are commonly implemented in an autonomous vehicle. Values shown in Table 1 are only shown for exemplary purposes as specific values may vary based on design considerations.

TABLE 1

| Constraints | RGB Camera | LiDAR | RaDAR |
| --- | --- | --- | --- |
| sensor type | passive | active | Active |
| lux interference | highly sensitive | not sensitive | not sensitive |
| sun-exposure interference | highly sensitive | slightly sensitive | not sensitive |
| weather interference | mildly sensitive | highly sensitive | slightly sensitive |
| sensing range | 50 meters | 100 meters | 150 meters |
| field of view | 60° | 360° | 30° |
| data resolution | dense | sparse | highly sparse |

According to Table 1 and the prior elaboration, an imaging sensor would likely be prone to light interference since inferior or excessive light intensities may jeopardize perceived qualities of acquired images. Contrary to general characteristics of an imaging sensor, the LiDAR and RaDAR transducers are much less influenced by interferences from any amount of light intensities because the sensing mediums of LiDAR and RaDAR are not located on the same frequency ranges as the visible light spectra. Thus from the perspective of lux interference, performing an object detection by using an imaging sensor would likely be less favorable in an environment having a certain amount of light intensities in contrast to a LiDAR-based or a RaDAR-based object detection system.

Moreover, the comparison among various sensing devices also shows the potential possibility of having interferences from sun exposures when operating these sensing devices within an autonomous vehicle. A direct sun exposure to a camera lens may introduce signal clipping that attenuates color information within the range of an exposure glare so as to result in salient information of acquired images being unintentionally removed. Similarly, a LiDAR is also slightly sensitive to a direct sun exposure as the radiated energy from the sun contains infrared (IR) waves that may fall within the range of a spectrum of a LiDAR receiver. However, the interference would not be nearly as high as in a camera since the IR wave from the LiDAR transmitter is modulated. On the other hand, a RaDAR transducer is hardly affected by the sun exposure since the means for sensing contains a radio frequency in the millimeter wave length range.

Outdoor environment for autonomous vehicles yields independent variables that may significantly lower performances of each sensing devices. Adverse weather conditions could be unavoidable constraints that are needed to be taken into account in order to implement an accurate object detection mechanism. The similarities among a camera, a LiDAR, and a RaDAR could be based on a framework of a non-contact sensing technique which requires a medium for information to be sent out and to be received back from an object to be detected by each of these distinct types of sensing devices. During an adverse weather condition (e.g. rain, fog, or haze), the medium may contain unwanted materials such as water droplets in rain, water colloid in fog, and pollutant colloid in haze which may reduce visibilities and thus attenuates the strength of information to travel between an object to be detected and its corresponding sensing device. Although performances of these sensing devices can be interfered by weather conditions, performances of a LiDAR could be shown to be the most inferior amongst the other types of sensing devices described in this disclosure.

FIG. 1A illustrates characteristics of commonly used sensing devices for an autonomous vehicle. FIG. 1B illustrates the field of view (FOV) and range of each of the sensing devices of FIG. 1A. An autonomous vehicle may use a RGB camera 101, a LiDAR 102, and a RaDAR 103 for sensing nearby objects. In addition to being affected by external constraints, internal specifications of these sensing devices (e.g. 101 102 103) may also contribute to their performances for object detections. As seen from Table 1, internal constraints that may influence sensing characteristics can be demarcated into at least three categories including but not limited to (a) sensing range, (b) FOV, and (c) data resolution. Each of these constraints may operate as a trade-off in performances for the RGB camera 101, the LiDAR transducer 102, and a RaDAR transducer 103.

For example, from the perspective of sensing ranges as shown in FIG. 1B, a RaDAR 103 may provide the broadest sensing range of up to 150 meters for most of known object detection algorithms. However, from the perspective of the FOV, a LiDAR 102 may offer the widest field of view that covers 360° or a full-view. Nevertheless, both RaDAR 103 and LiDAR 102 would likely fail to provide as high data resolution as the RGB camera 101.

Based on the above described elaborations, both internal and external constraints may potentially interfere with the data quality in a non-trivial manner and thus would affect performances of object detection for each of the data sensors. However, since the adverse conditions do not apply to all sensor at the same time, it is possible to address the drawback through utilization of comprehensive framework that implements multi sensing modalities and multi object detections.

SUMMARY OF THE DISCLOSURE

Accordingly, the disclosure is directed to an object detection system used by an autonomous vehicle, an autonomous vehicle using the same system, and an object detection method thereof.

In one of the exemplary embodiments, the disclosure is directed to an object detection system which would include not limited to: a first type of sensor for generating a first sensor data; a second type of sensor for generating a second sensor data; and a processor coupled to the first type of sensor and the second type of sensor and configured at least for: processing the first sensor data by using a first plurality of object detection algorithms and processing the second sensor data by using a second plurality of object detection algorithms, wherein each of the first plurality of object detection algorithms and each of the second plurality of object detection algorithms include environmental parameters calculated from a plurality of parameter detection algorithms; and determining for each detected object a bounding box resulted from processing the first sensor data and processing the second sensor data.

In one of the exemplary embodiments, the disclosure is directed to an autonomous vehicle which includes not limited to: an object detection system including a first type of sensor for generating a first sensor data; a second type of sensor for generating a second sensor data; and a processor coupled to the first type of sensor and the second type of sensor and configured at least for: processing the first sensor data by using a first plurality of object detection algorithms and processing the second sensor data by using a second plurality of object detection algorithms, wherein each of the first plurality of object detection algorithms and each of the second plurality of object detection algorithms include environmental parameters calculated from a plurality of parameter detection algorithms; and determining for each detected object a bounding box resulted from processing the first sensor data and processing the second sensor data.

In one of the exemplary embodiments, the disclosure is directed to an object detection method used by an autonomous vehicle, the method would include not limited to: generating, by using a first type of sensor, a first sensor data; generating, by using a second type of sensor, a second sensor data; processing the first sensor data by using a first plurality of object detection algorithms and processing the second sensor data by using a second plurality of object detection algorithms, wherein each of the first plurality of object detection algorithms and each of the second plurality of object detection algorithms include environmental parameters calculated from a plurality of parameter detection algorithms; and determining for each detected object a bounding box resulted from processing the first sensor data and processing the second sensor data.

In order to make the aforementioned features and advantages of the disclosure comprehensible, exemplary embodiments accompanied with figures are described in detail below. It is to be understood that both the foregoing general description and the following detailed description are exemplary and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
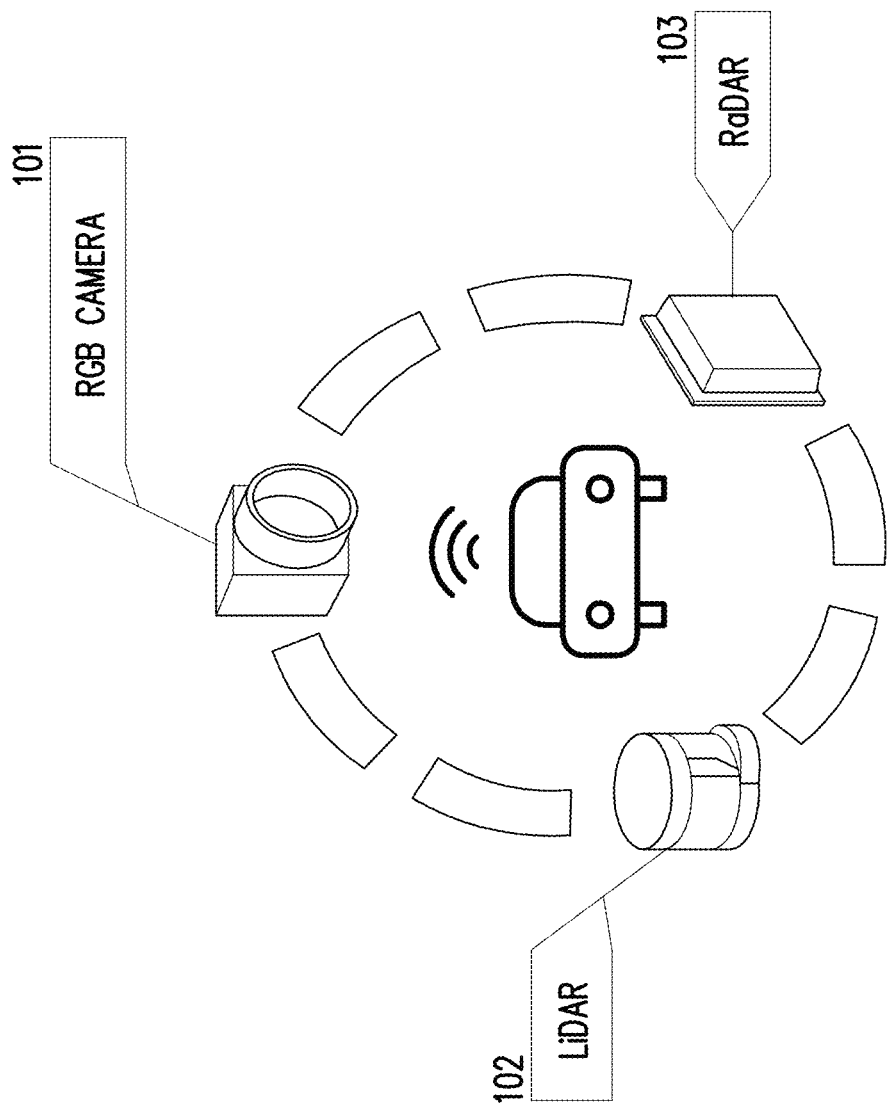
FIG. 1A illustrates characteristics of commonly used sensing devices for an autonomous vehicle.
Figure 1B:
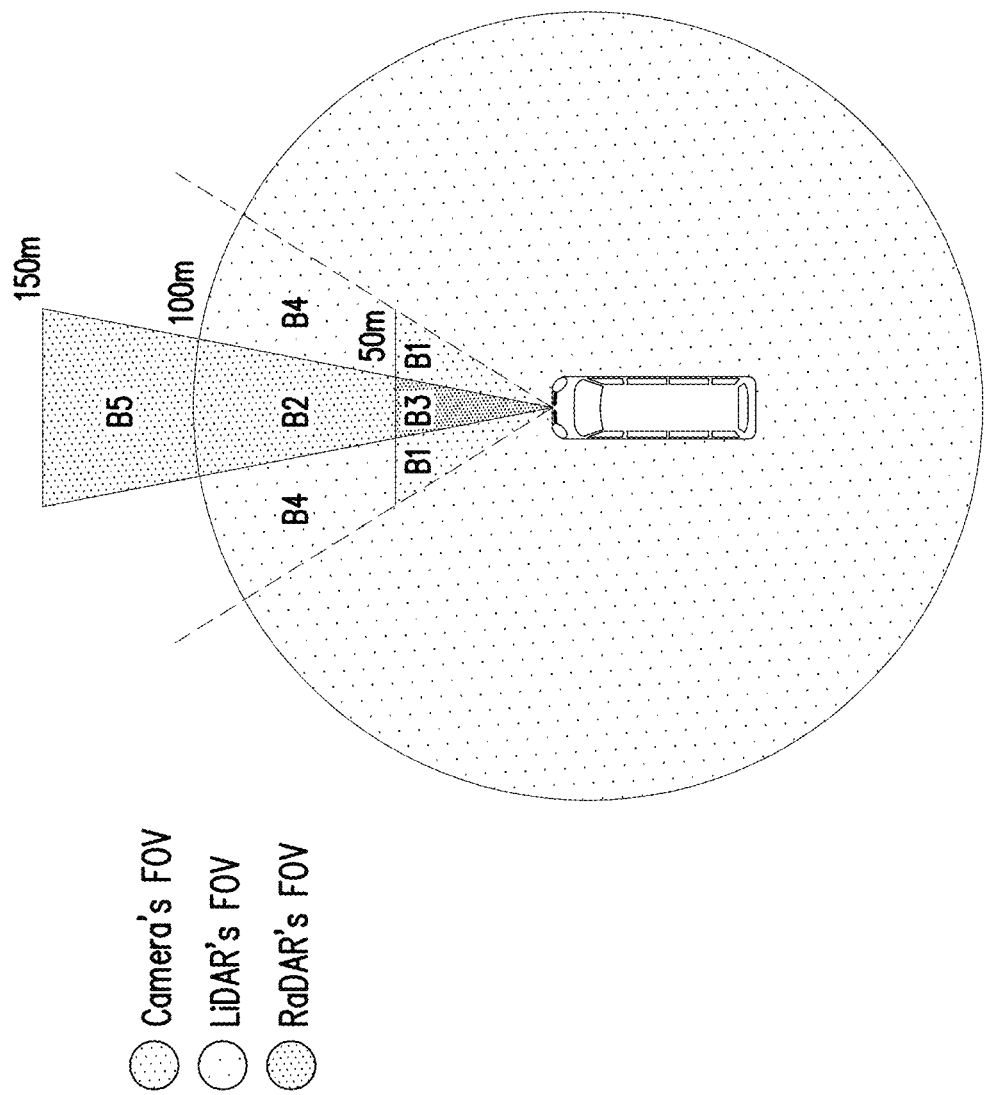
FIG. 1B illustrates the FOV and range of each of the sensing devices of FIG. 1A.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a framework for an autonomous vehicle to detect nearby objects, and the framework is to be explained from the perspective of an object detection system, an autonomous vehicle that uses the object detection system, and an object detection method. The system could be disposed within an autonomous vehicle which would operate automatically without human intervention and thus object detection accuracy would be paramount. The system would include not limited to multiple sets of different sensing devices with overlapping FOVs such as a set of imaging devices having one or more image sensors for acquiring two dimensional (2D) RGB data from the surroundings, a set of LiDAR transducers having one or more LiDAR transducers for acquiring three dimensional (3D) point clouds volume from the surrounding, a set of RaDAR transducers having one or more RaDAR transducers for acquiring 3D echo points volume from the surrounding, and a processing unit configured at least to execute a set of object detection algorithms for each type of sensor and analyzes the detection results from all algorithms to determine the final detection results based on sensors' characteristics and behaviors against various constraints. Such constraints may include light intensities, weather condition, exposure levels, object positions, object distances, and detection algorithms' reliability. Available information acquired from the sensors would be integrated on each early detection results which are then further analyzed automatically by a processing device to obtain a final detection result which could be a part of a comprehensive data for further analysis. Through the provided framework, false positives could be suppressed so as to increase the accuracy of the overall object detection. FIG. 2~FIG. 5 elucidates the provided object detection framework with further details.

Figure 2:
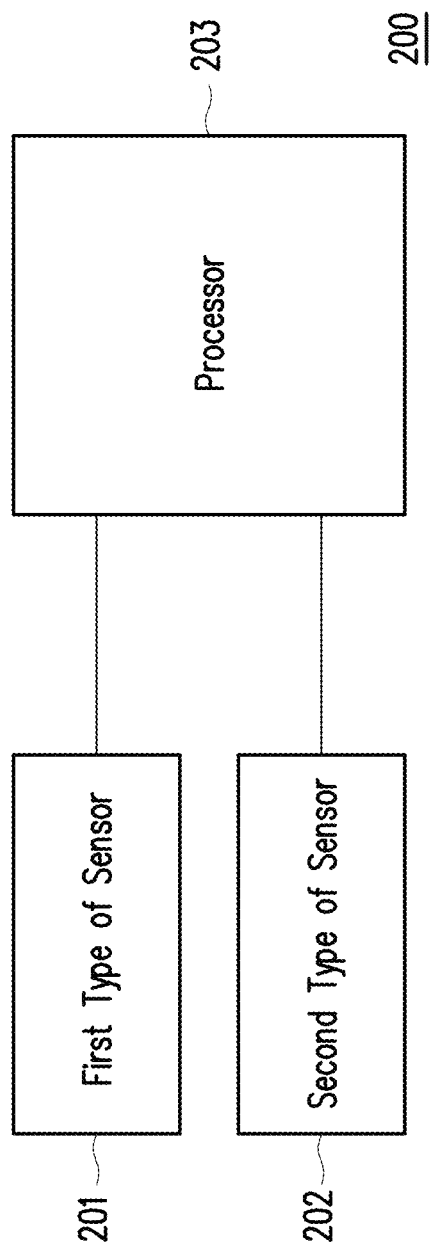
FIG. 2 illustrates a hardware block diagram of an object detection system in accordance with one of the exemplary embodiments of the disclosure.

FIG. 2 illustrates a hardware block diagram of an object detection system in accordance with one of the exemplary embodiments of the disclosure. The object detection system would include not limited to a first type of sensor 201, a second type of sensor 202, and a processor 203. The first type of sensor 201 could be an imaging sensor such as a RGB image sensor that captures visible light within a designated FOV into a 2D image. The second type of sensor 202 could be an imaging or ranging sensor such as a LiDAR sensor or RaDAR sensor that sample reflected signals from within a designated FOV and reconstruct a 3D volume accordingly. The processor 203 would be configured at least for processing the first sensor data by using a first plurality of object detection algorithms and processing the second sensor data by using a second plurality of object detection algorithms. Each of the first plurality of object detection algorithms and each of the second plurality of object detection algorithms would include environmental parameters calculated from a plurality of parameter detection algorithms. The processor 203 would then be configured for determining, for each detected object, a bounding box resulted from processing the first sensor data and processing the second sensor data.

Assuming that the first type of sensor 201 is a RGB image sensor such as a RGB camera, the first plurality of object detection algorithms may include one or a combination of a 'YOLO' algorithm as taught by J. Redmon et al., "*You Only Look Once: Unified, Real-time Object Detection*," CoRR, vol. abs/1506.02640, 2016, a Faster R-CNN algorithm as taught by S. Ren et al., "*Faster R-CNN: Towards Real-time Object Detection with Region Proposal Networks*," CoRR, vol. abs/1506.01497, 2016, and a Single Shot Detection (SSD) algorithm as taught by W Liu et al., "*SSD: Single Shot Multibox Detector*," CoRR, vol. abs/1512/02325, 2015. Each of the above described object detection algorithms are incorporated by reference.

Assuming that the second type of sensor 202 is imaging or ranging sensor such as a LiDAR sensor, the second plurality of object detection algorithms may include one or a combination of a 3D-FCN algorithm as taught by B. Li et al., "*Vehicle Detection from 3D Lidar Using Fully Convolutional Network*", CoRR, vol. abs/1608.0791, 2016, TuSimple algorithm as taught by J. Guo et al., "*Exploit All the Layers: Fast and Accurate CNN Object Detector with Scale Dependent Pooling and Cascaded Rejection Classifiers*," IEEE CVPR, pp. 770-779, 2016, and L-SVM algorithm as taught by C. Guidel, "*Joint Object Detection and Viewpoint Estimation using CNN Features*," IEEE VES, pp.

145-150, 2017. Each of the above described object detection algorithms are incorporated by reference.

Figure 3:
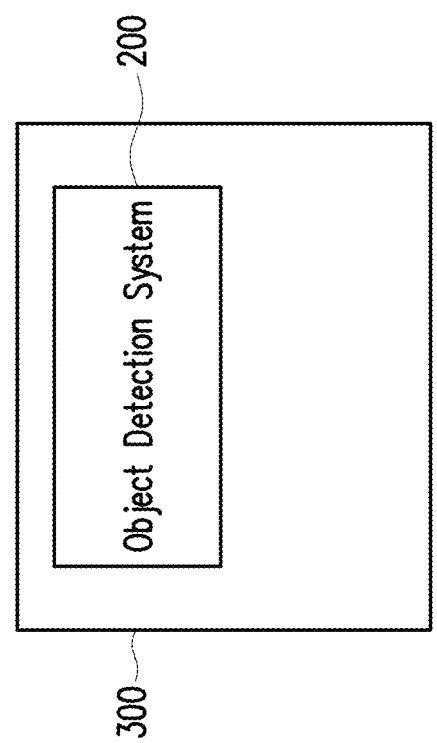
FIG. 3 illustrates an autonomous vehicle which uses an object detection system in accordance with one of the exemplary embodiments of the disclosure.

FIG. 3 illustrates an autonomous vehicle which uses an object detection system in accordance with one of the exemplary embodiments of the disclosure. The autonomous vehicle 300 would include not limited to the object detection system 200 as shown in FIG. 2.

Figure 4:
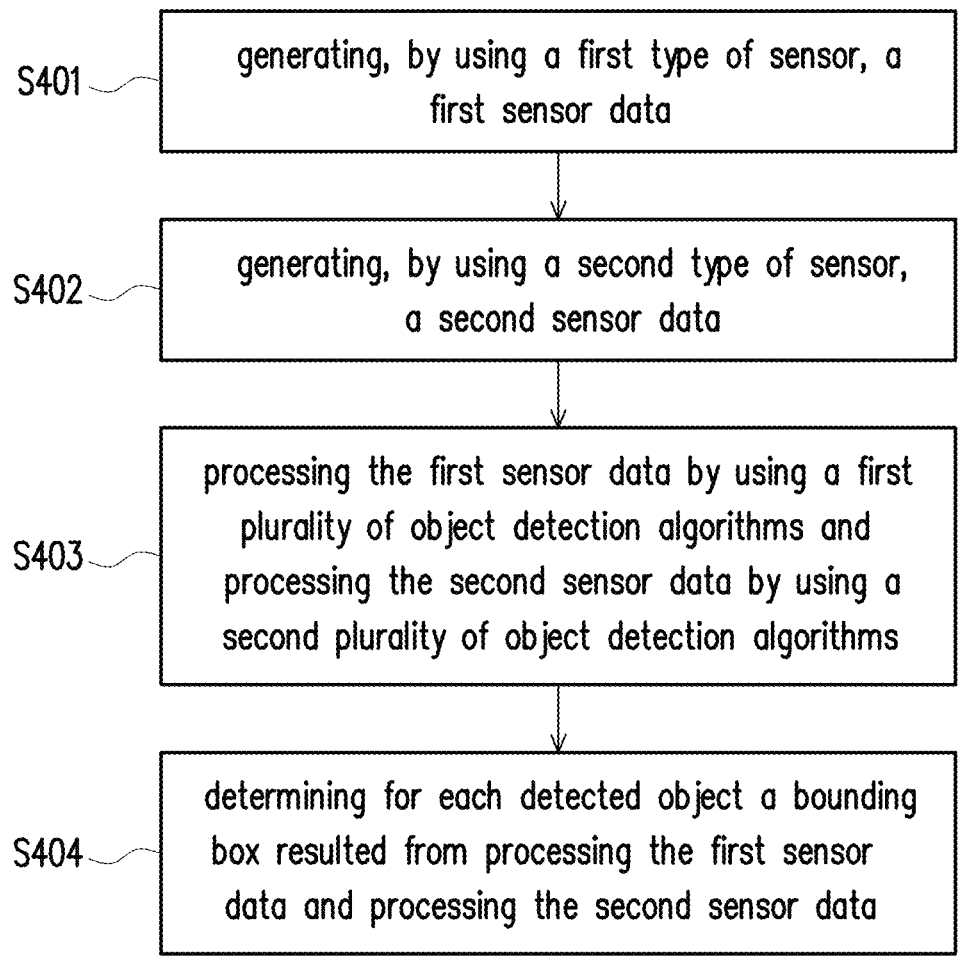
FIG. 4 is a flow chart which illustrates steps of an object detection method in accordance with one of the exemplary embodiments of the disclosure.

FIG. 4 is a flow chart which illustrates steps of an object detection method by using an object detection system in accordance with one of the exemplary embodiments of the disclosure. In step S401, the object detection system would generate, by using a first type of sensor, a first sensor data. In step S402, the object detection system would generate, by using a second type of sensor, a second sensor data. In step S403, the object detection system would process the first sensor data by using a first plurality of object detection algorithms and would also process the second sensor data by using a second plurality of object detection algorithms. Each of the first plurality of object detection algorithms and each of the second plurality of object detection algorithms would include environmental parameters calculated from a plurality of parameter detection algorithms. In step S404, the object detection system would determine, for each detected object, a bounding box resulted from processing the first sensor data and processing the second sensor data.

Figure 5:
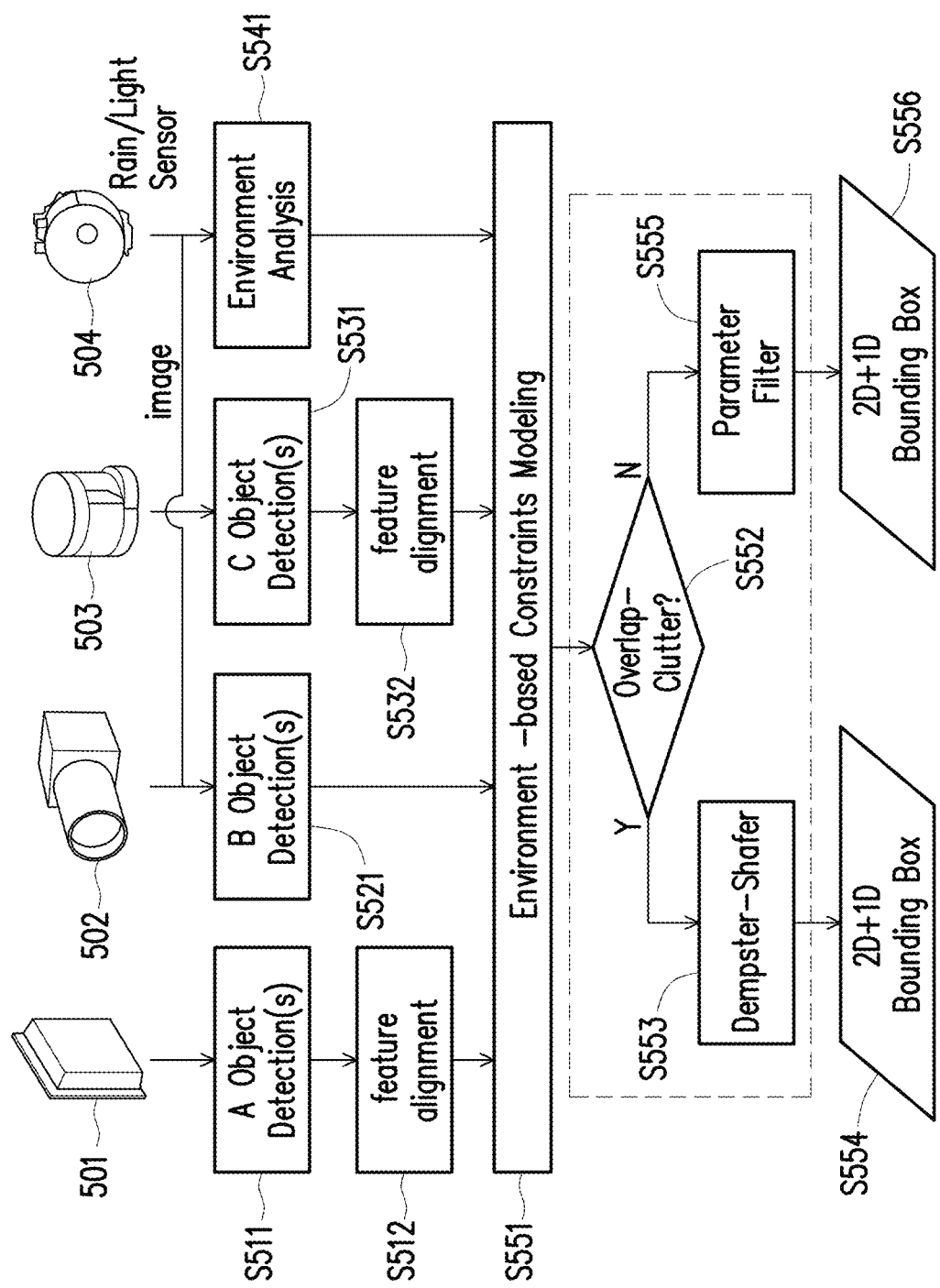
FIG. 5 illustrates a block diagram of the object detection framework in accordance with one of the exemplary embodiments of the disclosure.

FIG. 5~FIG. 12B elucidates the provided object detection framework with several exemplary embodiments and examples. FIG. 5 illustrates a detailed block diagram of the object detection framework in accordance with one of the exemplary embodiments of the disclosure. The framework to be described would include a detection fusion system that that utilizes multiple types of sensing devices to perform object detections by using multiple object detection algorithms (i.e. classifiers) for each type of sensing devices over the overlapping FOVs (as illustrated in FIG. 2). The multiple types of sensing devices may include a RaDAR transducer array 501, a RGB camera array 502, a LiDAR transducer array 503, and an environmental sensor array 504. The environmental sensor 504 array could be, for example, an array of one or more rain sensors, visible spectrum light sensors, pressure sensors, and etc.

To be more specific, the environmental data collected from the environmental sensor array 504 may include detected weather condition, local intensity measurements and over/under-exposure detections which are subsequently used by the feature alignment S512 S532 process to calculate objects' relative distance, objects' relative angular position, the classifier's confidence of the corresponding objects, and/or any other parameter that may affect the performance of object detection based on the corresponding type of sensors. The collected environmental data are then normalized to conform to the characteristics of each type of sensors through mathematical modeling that estimates the outcome in a uniform range of normalized values.

As shown in FIG. 5, the RaDAR transducer array 501 could be a set of one or more RF transducers, and each transducer may collect a set of raw sensor data used to perform A object detection(s) S511. Similarly, the RGB camera array 502 could be a set of one or more image sensors, and each image sensor may collect a set of raw sensor data used to perform B object detection(s) S521. Also, the LiDAR transducer array 503 could be a set of one or more infrared transducers, and each transducer may collect a set of raw sensor data used to perform C object detections(s) S531. The environmental sensor array 504 could be one or more different types of sensors that collects environmental data which are used to perform environmental analysis S541. The raw data from each of the sensing devices (i.e. 501 502 503 504) could be obtained simultaneously, and object detections from the different types of sensing devices could also be performed simultaneously.

Next, various object detection algorithms of each of the sensing devices (i.e. 501 502 503 504) would be applied to obtain each detected object's class and position which could be characterized by a BB. During feature alignment S512 S532, environmental based constraints could be obtained from each of the environmental sensors 504. The environmental-based constraints modeling S551 would then be performed by fusing all the data as the results of steps S512, S521, S532, and S541 and apply one or a plurality of object detection algorithms for each of the results in order to recognize one or more detected objects' classes and position as preliminary detection results. In other words, in S551, the object detection results S512, S521, and S532 from each of the sensors 501 502 503, and obtained values of some environmental-based constraints and environment analysis S541 from each of the environmental sensors would be combined together as the preliminary detection results which are fused together through a decision fusion module that analyzes the preliminary detection results based on the enviromnent-based constraints. The preliminary detection results could be selected from the most reliable detection results based on various constraints from the relationships of the preliminary detection results and the characteristics of the corresponding sensor according to the environment conditions.

Each type of sensing devices (e.g. 501 502 503 504) would be assigned with a set of dedicated object detection algorithms which generates preliminary object detection results (e.g. RaDAR transducer array 501 and LiDAR transducer 503 are in the 3D coordinate system while RGB camera array 502 is in the 2D coordinate system). Before the data fusion can be performed on the preliminary detection results and before the final detection results could be produced, the results from RaDAR transducer array 501 and LiDAR transducer array 503 are transformed from 3D to 2D coordinate system S512 S532 by using feature alignment modules. These modules would rectify the input format for the decision fusion to be synchronized in the 2D coordinate system with depth information being embedded for each preliminary detection results. However, if the preliminary detection result is projected outside the overlapping FOVs, then the corresponding data would directly process as the final detection result in the 3D coordinate system.

Each of the rectified-preliminary detection results could be in the form of a bounding box (BB), and two BBs could be analyzed pair-wisely based on relationship criterions that include comparisons of the object-based constraints which may include spatial distance, depth, and class values. Thus, determining whether the paired rectified-preliminary detection results could be dependent or independent to each other. In the scenario of FIG. 5, there could be a cluster of up to three BBs as each BB is generated from a different type of sensing device.

Two distinct techniques could be used to analyze the rectified-preliminary detection results based on the overlapping-cluttering criterions that were observed between each pair of the rectified-preliminary detection results. Thus, in S552, whether the BBs are cluttered and overlapped would be determined. The final detection results would be determined from the preliminary detection results based on using the normalized constraints parameters. Whether there is cluttering is determined based on whether any pair of rectified-preliminary detection results has less than a predetermined detection distance threshold as calculated based on the L2 distance between the centroids between two BBs. Also, whether there is overlapping is determined based on whether an overlapping area between the paired BBs has exceeded a predetermined area threshold. If the BBs are both cluttered and overlapped, the detection result would utilize the Dempster-Shafer module S553; otherwise, the detection result would utilize a parameter filter module S555. For any pair of dependent BB, Dempster-Shafer module S553 could be used to preserve the more reliable BB and remove the other BB from the corresponding pair based on the analysis on the total confidence of all parameters. For any independent BB, parameter filter module S555 would be utilized to determine whether the stand-alone BB is preserved or removed based on the analysis on the total confidence of all parameters against its pseudo BB.

Figure 6:
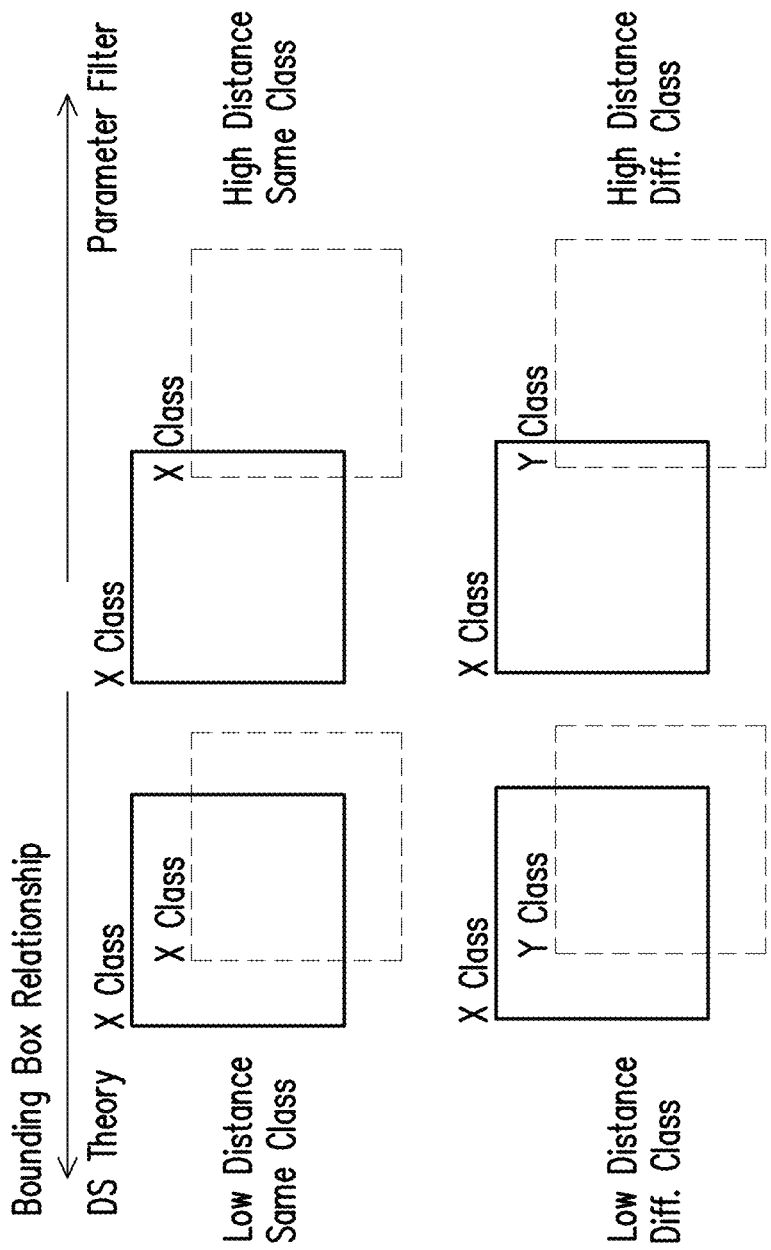
FIG. 6 illustrates techniques used in analyzing bounding boxes in accordance with one of the exemplary embodiments of the disclosure.

The Dempster-Shafer module S553 can be briefly described as a technique to competitively confront a paired of BBs according to the confidence values of different observed variables (which will be described in further details in sections to come). The development purpose of the Dempster-Shafer module S553 is to improve the detection accuracy by preserving a detection result which has the highest reliability according to the observed variables. The final detection results as determined by the Dempster-Shafer module S553 would be an object highlighted by a BB S554. Similarly, the parameter filter module S555 is a filtering technique to discriminatively measure the reliability of any independent bounding box as compared to a pseudo-version of the BB based on the confidence values of different observed variables. The pseudo bounding box is created based on the original bounding box and thus possesses the same observed constraints. However, the constraints of the pseudo bounding box are calculated with modeling equations as if measured with other type of sensor. As shown in FIG. 6, a pair of BBs with the same or different detected class of object would be analyzed by using the Dempster-Shafer module S553 when the cluttering distances and the overlapping areas are smaller; whereas a pair of BBs with the same or different detected class of object would be analyzed by using the parameter filter module S555 when the cluttering distances and the overlapping areas are larger.

Figure 7:
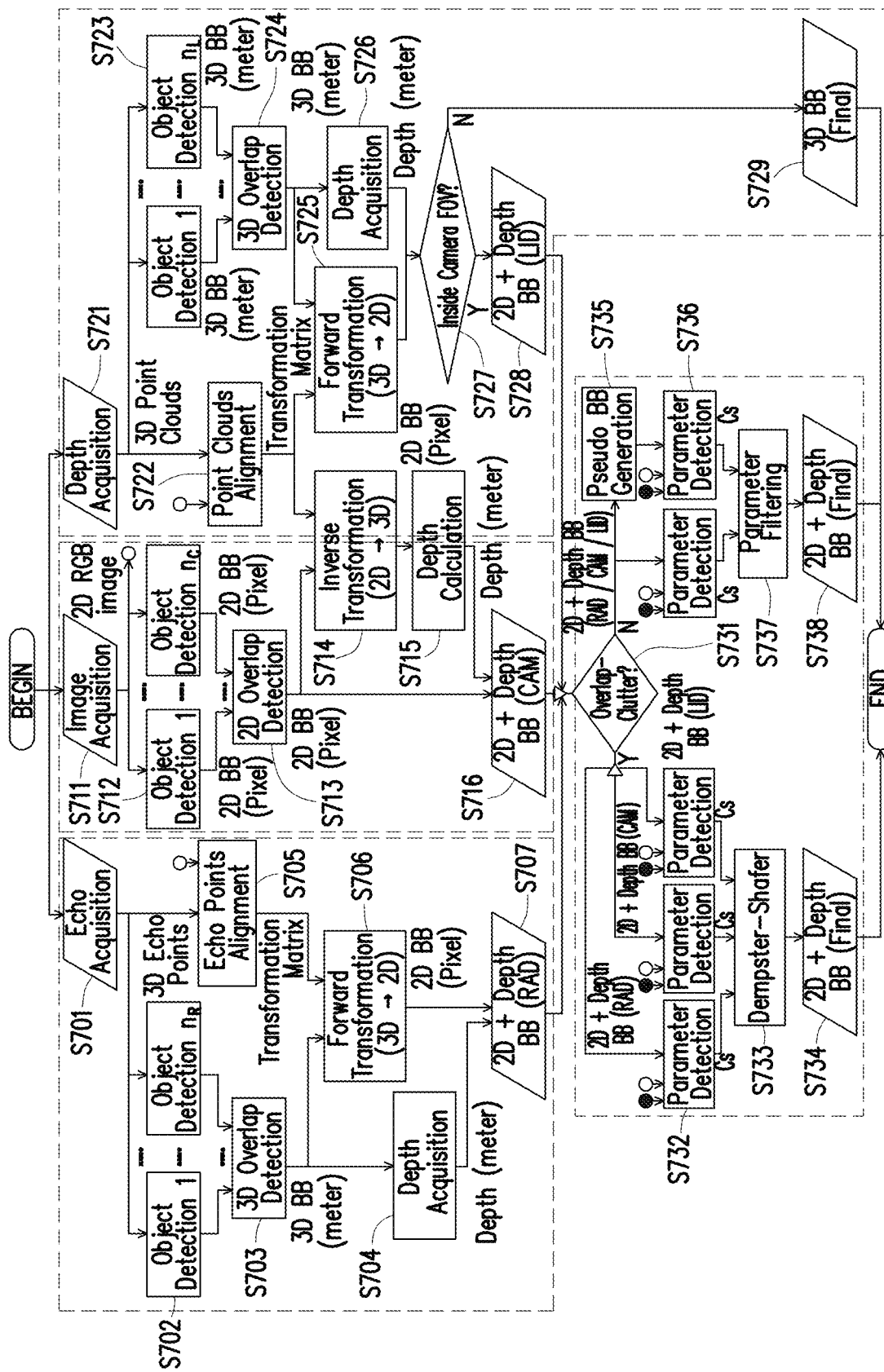
FIG. 7 is a detailed block diagram which illustrates generating sensor data and subsequently analyzing detection results to output bounding boxes in accordance with one of the exemplary embodiments of the disclosure.

FIG. 7 shows a more detailed block diagram by expanding upon the embodiment of FIG. 5. In FIG. 7, the embodiment is assumed to use a RaDAR sensor array (e.g. 501) having one or more RaDAR sensors, a RGB camera array (e.g. 502) having one or more RGB cameras, and a LiDAR sensor array (e.g. 503) having one or more LiDAR sensors. The RaDAR sensor array would execute steps S701~S707 to generate one or more RaDAR preliminary detected objects with each of the one or more preliminary detected objects presented in a 2D BB having a depth information. The RGB camera array would execute steps S711~S716 to generate one or more camera preliminary detected objects with each of the one or more preliminary detected objects presented in a 2D BB having a depth information. The LiDAR sensor array would execute steps S721~S728 to generate one or more LiDAR preliminary detected objects with each of the one or more preliminary detected objects either presented in a 2D BB having a depth information or presented in as a 3D BB based on whether the preliminary detected object is within a FOV which overlaps with the FOVs of the RaDAR sensor array and the RGB camera array. A processor (e.g. 203) would fuse all the information of the preliminary detected objects from the RaDAR sensor array, the RGB camera array, and the LiDAR sensor array and process the information by incorporating environment-based modeling to derive a final set of detected object presented in a BB. Alternatively, the processor (e.g. 203) may also execute all of the steps including S701~S707, S711~S716, S721~S729, and S731~S738. The details of FIG. 7 are described as follows.

In S701, an echo points acquisition module of the RaDAR sensor array would obtain raw sensor data from the RaDAR sensor array. In S702, there are $n_R$ number of object detection algorithms that are implemented to generate raw detection results in a 3D coordinate system, and the $n_R$ number is an integer greater than one. In S703, the raw detection results are then analyzed based on the 3D overlapping detection which measures the BB distance of each pair of raw detection results in order to generate preliminary detection results. In S705, an echo points alignment module of would receive raw sensor data from the echo points acquisition module S701 and generate a transformation matrix. In S704, a depth acquisition module would calculate depth information for each of the rectified-preliminary detection results. In S706, the preliminary detection results are rectified to convert its coordinate system from 3D to 2D by using a forward transformation module which requires the transformation matrix from the echo points alignment module S705, and generate 2D BB. In S707, one or more RaDAR rectified-preliminary detected objects presented in a 2D BB embedded with corresponding a depth information would be generated.

For the RGB camera array, in S711, an image acquisition module would capture one or more still or continuous images. In S712, there are $n_c$ number of object detection algorithms that are implemented to generate raw detection results in a 2D coordinate system format. In S713, these raw detection results are analyzed based on the 2D overlapping detection which measures a BB distance for each pair of the raw detection results so as to generate the preliminary detection results. In S714, an inverse transformation module would receive the preliminary detection results to convert them from 2D into a 3D coordinate system format by using a transformation matrix from a point clouds alignment module from S722. In S715, the depth information of each BB of the preliminary detection results is calculated by using the converted results in 3D coordinate system. After acquiring the depth information, in S716, the rectified-preliminary detection results from S713 would be embedded with corresponding depth information from S715 to generate one or more camera preliminary detected objects with each of the one or more rectified-preliminary detected objects presented in a 2D BB having a depth information.

For the LiDAR sensor array, in S721, sensor data as 3D point clouds would be acquired from a depth acquisition module. In S722, a point clouds alignment module would receive the 3D point clouds to output a transformation matrix. In S723, there are $n_L$ number of object detection algorithms that would receive the captured images to generate the raw detection results in a 3D coordinate system format. In S724, these raw detection results are then analyzed based on the 3D overlapping detection which measures a BB distance for each pair of raw detection results so as to generate preliminary detection results. In S725, these preliminary detection results are rectified to convert its coordinate system from 3D to 2D by using a forward transformation module which requires a transformation matrix from the point clouds alignment module from S722. In S726, depth information (in meters) is calculated for each of the rectified-preliminary detection results in 2D by using a depth acquisition module.

In S727, whether the converted rectified-preliminary detection results would fall within a FOV which overlaps with the FOVs of the LiDAR sensor array and the RGB camera array would be determined. If the converted preliminary detection results would fall within the FOV which overlaps with the FOVs of the LiDAR sensor array and the RGB camera array, then in S728, the converted rectified-preliminary detection results would be embedded with the corresponding depth information to generate one or more LiDAR rectified-preliminary detected objects with each of the one or more rectified-preliminary detected objects presented in a 2D BB having a depth information. If the converted rectified-preliminary detection result would fall outside the FOV which overlaps with the FOVs of the LiDAR sensor array and the RGB camera array, then in S729, one or more LiDAR preliminary detected objects with each of the one or more preliminary detected objects presented in a 3D BB would be generated and will be directly regarded as the final detection results using the original 3D coordinate system.

In S731, all the outputs from S707, S716, and S728 are fused together to determine whether the BBs are cluttered and overlapped to in order to determine the final detection results based on normalized parameters. Assuming that there is sufficient cluttering and overlapping based on the previously described criteria, then S732~S734 would be executed; otherwise S735~S738 would be executed. In S732, each of the outputs from S707, S716, S728 would be sent to a parameter detection module which will be described in latter section with further details. In S733, the Dempster-Shafer module would process the outputs of all of the parameter detection modules by preserving the more reliable BB and by removing the other BB for each corresponding pair based on the analysis on the total confidence of all parameters. The Dempster-Shafer would output final detection results as an object highlighted by a BB S554 and has a corresponding depth information.

In S735, the outputs from S707, S716, and S728 are transmitted to a pseudo BB generation module and a parameter detection module. The output pseudo BB generation module would also be transmitted to a parameter detection module. In S736, each of the parameter detection module would process received data and transmit the processed data to a parameter filtering module. The parameter detection module will be described in latter section with further details. In S737, the parameter filtering module would determine whether the stand-alone BB is preserved or removed based on the analysis on the total confidence of all parameters against the outputs of the pseudo BB generation module. The parameter filter module S555 would discriminatively measure the reliability of any independent bounding box as compared to a pseudo-version of the BB based on the confidence values of different observed variables. In S738, the parameter filing module would output final detection results as an object highlighted by a BB S554 and has a corresponding depth information.

Figure 8:
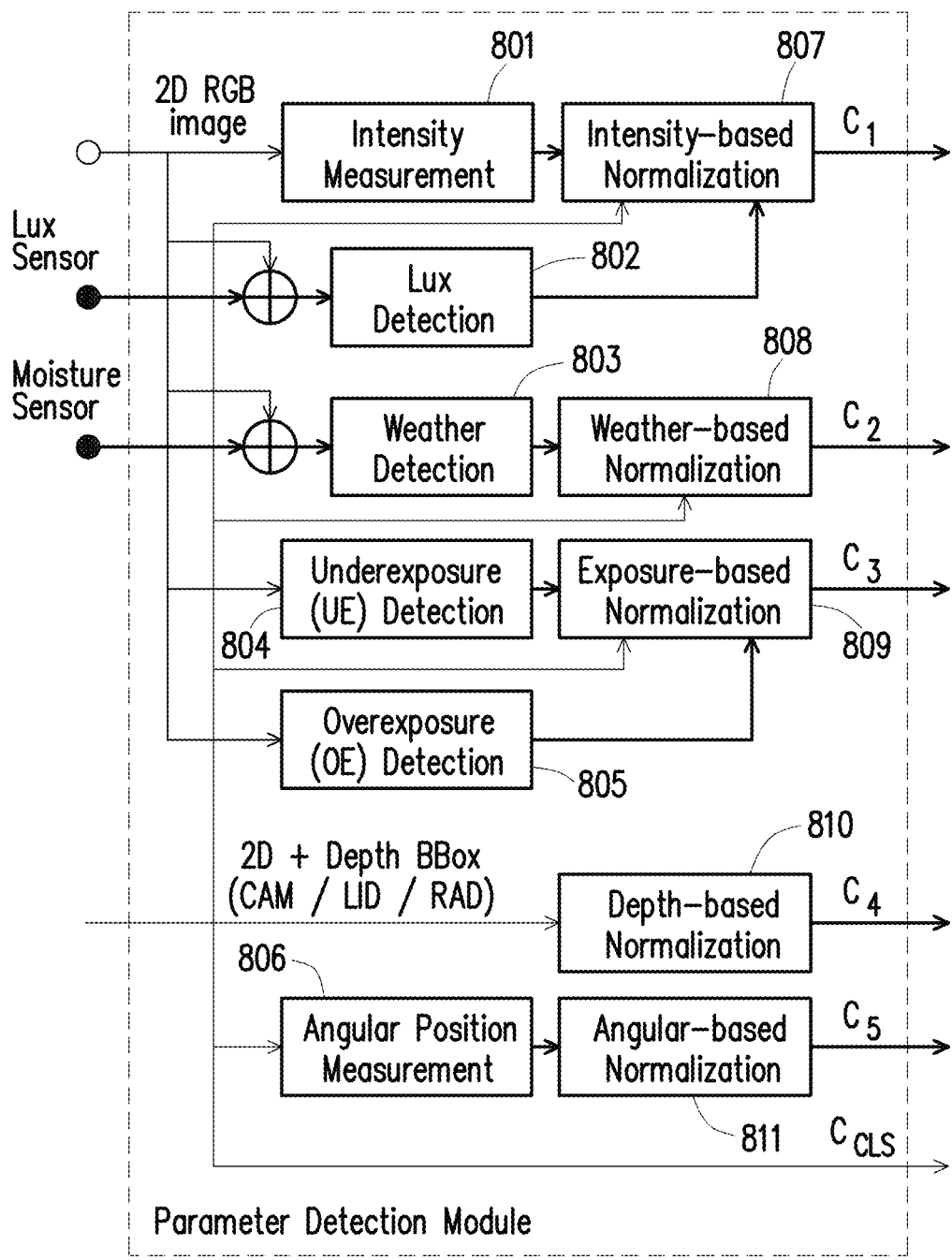
FIG. 8 illustrates a parameter detection algorithm in accordance with one of the exemplary embodiments of the disclosure.

FIG. 8 illustrates an overall diagram of a parameter detection module in accordance with one of the exemplar embodiments of the disclosure. A parameter detection module may specify six environment-based constraints and may also specify one additional constraint by utilizing an intensity measurement module 801, a lux detection module 802, a weather detection module 803, a underexposure detection (UE) module 804, an overexposure detection (OE) module 805, and an angular position measurement module 806.

The intensity measurement module 801 would measure light intensities in the uniformly-sized regions of the input RGB image by calculating the average luma value of each region. The measurements are performed on local patches of images from the camera sensor with continuous values (I) from range 0 (being dark) to 1 (being bright). The I value of the bounding box is normalized by an intensity-based normalization module 807 according to the type of the sensor as:

$$C_1(I) = \left(\frac{1}{1 + 10e^{(-I.10)+1}}\right)^2 \text{ for camera} \tag{1A}$$

$$C_1(I) = \left|1 - \left(\frac{1}{1 + 10e^{(-I.10)+1}}\right)^2\right| \text{ for LiDAR} \tag{1B}$$

$$C_1(I) = 1 \text{ for RaDAR} \tag{1C}$$

The output of the intensity-based normalization module 807 denotes the confidence value based on the intensity measurement ($C_1$).

The lux detection module 802 would determine the light intensity of the input RGB image by comparing the average luma values from all local regions inside the image or from the dedicated lux sensor. The detection is characterized as discrete values (L) range 0 (being dark) or 1 (being bright). The L value of the bounding box will be used in the intensity-based normalization module 807.

Weather detection module 803 would determine the real-time weather condition through analyzing the pattern of the frequency-domain of the input RGB image. The measurement is performed globally on the images from camera sensor or from the dedicated moisture sensor. The detection is characterized as discrete values (W) range 0 (being bad weather) or 1 (being good weather). The W value of the BB is normalized by the weather-based normalization module 808 according to the type of the sensor as:

$$C_2(W) = \begin{cases} \alpha & \text{if } W = 0 \\ 1 & \text{if } W = 1 \end{cases} \text{ for camera} \tag{2A}$$

$$C_2(W) = \begin{cases} \beta & \text{if } W = 0 \\ 1 & \text{if } W = 1 \end{cases} \text{ for LiDAR} \tag{2B}$$

$$C_2(W) = \begin{cases} \gamma & \text{if } W = 0 \\ 1 & \text{if } W = 1 \end{cases} \text{ for RaDAR} \tag{2C}$$

where $\alpha$, $\beta$ and $\gamma$ represent the predefined constants. The output of the weather-based normalization module 808 denotes the confidence value based on the weather detection ($C_2$).

The underexposure detection module 804 and the overexposure detection module 805 would lead to quantifying the level of under- and over-exposures for each pixel of the input RGB image by evaluating the image's contrast, luma, and saturation. The detections are performed locally on pixel level as continuous values (U and O) range 0 (not being under- or over-exposed) to I (being under- or over-exposed). The U and O values of the BBs are normalized by the exposure-based normalization module 809 according to the type of the sensor as:

$$C_3(O, U) = 1 - w_L \times 0 - (1 = w_L) \times U$$

with

-continued $$w_L = \begin{cases} \varphi & \text{if } L = 1 \\ 1 - \varphi & \text{if } L = 0 \end{cases} \text{ for camera} \quad (3A)$$

$$C_3 = (O, U) = 1 - 0 \text{ for LiDAR} \quad (3B)$$

$$C_3 = (O, U) = 1 \text{ for RaDAR} \quad (3C)$$

The output of the exposure-based normalization module 809 denotes the confidence value based on the under- and over-exposures ($C_3$).

Depth estimations (e.g. S704, S715, S726) would straightforwardly acquires the depth values from the rectified-preliminary detection results. The detection is characterized as continuous values (D) range 0 (being too close) or 1 (being too far). The depth (D) value of the BB is normalized by the depth-based normalization module 810 according to the type of the sensor as:

$$C_4(D) = \begin{cases} \left(\frac{1}{1+10e^{(-D.50)+1}}\right)^2 & \text{if } D < \theta \\ 1 - \left(\frac{1}{1+10e^{(-(D-\theta).20)+1}}\right)^2 & \text{if } D \geq \theta \end{cases} \text{ for camera} \quad (4A)$$

$$C_4(D) = \begin{cases} \left(\frac{1}{1+10e^{(-D.60)+1}}\right)^2 & \text{if } D < \theta \\ 1 - \left(\frac{1}{1+10e^{(-(D-\theta).25)+1}}\right)^2 & \text{if } D \geq \theta \end{cases} \text{ for LiDAR} \quad (4B)$$

$$C_4(D) = \begin{cases} \left(\frac{1}{1+10e^{(-D.50)+1}}\right)^2 & \text{if } D < \theta \\ 1 - \left(\frac{1}{1+10e^{(-(D-\theta).20)+1}}\right)^2 & \text{if } D \geq \theta \end{cases} \text{ for RaDAR} \quad (4C)$$

where $\theta$ denotes the characterization parameter. The output of the depth-based normalization module 810 denotes the confidence value based on the depth value ($C_4$).

The angular position estimation module 806 would quantifies the angular position of the bounding box centroid from the Cartesian to the cylindrical coordinate system. The estimation is performed locally on each rectified-preliminary BBs as continuous values (T). The T value of the bounding box is normalized by the angular-based normalization module 811 according to the type of the sensor as:

$$C_5(R, T) = 1 - \frac{2}{\pi}\cos^{-1}\left(\frac{R_y - T_y}{\sqrt{(R_y - T_y)^2 + (R_x - T_x)^2}}\right) \text{ for camera} \quad (5A)$$

$$C_5(R, T) = 1 \text{ for LiDAR} \quad (5B)$$

$$C_5(R, T) = 1 - \frac{2}{\pi}\cos^{-1}\left(\frac{R_y - T_y}{\sqrt{(R_y - T_y)^2 + (R_x - T_x)^2}}\right) \text{ for RaDAR} \quad (5C)$$

where R denotes the reference coordinate. The output of the angular-based normalization module 811 denotes the confidence value based on the angular position ($C_5$).

In addition, the set of confidence values are also completed with reliability score for the corresponding object detection algorithm, which is denotes as $C_{CLS}$. After calculating the required number of confidence values, the independent rectified-preliminary detection results along with the set of confidence values are sent to the parameter filtering module S737. Nevertheless, the pseudo BB is generated by simulating the detection result as if created by different sensing modality. The modality for pseudo-BB is chosen based on BB that provides the lowest cumulative confidence value. The final confidence value for the independent rectified-preliminary detection results is measured as:

$$C = C_{CLS} \times \sum_{i=1}^{5}\left(\frac{1}{w_i} \times C_i\right) \quad (6)$$

where $w_i$ denotes the weighting coefficient for each type of confidence values. In addition, the final confidence value for the pseudo BB is measured as:

$$\overline{C} = (1 - C_{CLS}) \times \sum_{i=1}^{5}\left(\frac{1}{w_i} \times \overline{C}_i\right) \quad (7)$$

if $C > \overline{C}$, then the detection from classifier remains; otherwise, the detection from classifier is eliminated. In addition, a prerequisite is added where if $C_{CLS}=0$, then $C_{CLS}=0.5$.

After the parameter detections (e.g. S732 S736) have completed, the rectified-preliminary detection results including $C_1 \sim C_5$ and $C_{CLS}$ from each of the parameter detection modules along with sets of confidence values are transmitted to either a Dempster-Shafer module S733 or a parameter filtering module S737. For the cluster of BBs that fit into the aforementioned criterions to be sent to the Dempster-Shafer module S733, the processes of a cluster pair would follow one of the following cases:

For case 1, if classes of the BBs from a first type of sensor's classifier and a second type of sensor's classifier are the same, then the final confidence value for the first type of sensor's rectified-preliminary detection results is measured as:

$$C_A = \left(\frac{1}{w_{A,CLS}} \times C_{A,CLS}\right) + \sum_{i=1}^{5}\left(\frac{1}{w_{A,i}} \times C_{A,i}\right) \quad (8)$$

and the final confidence value for the second type of sensor's rectified-preliminary detection results is measured as:

$$C_B = \left(\frac{1}{w_{B,CLS}} \times C_{B,CLS}\right) + \sum_{i=1}^{5}\left(\frac{1}{w_{B,i}} \times C_{B,i}\right) \quad (9)$$

if $C_A > C_B$, then the detection from the first type of sensor's classifier would be kept; otherwise, the detection from the second type of sensor's classifier would be kept.

For case 2, if classes of the BBs from the first type of sensor's classifier and the second type of sensor's classifier are not the same, then the final confidence values for the first type of sensor's rectified-preliminary detection results are measured as:

$$C_{A,1} = \left(\frac{1}{w_{A,CLS}} \times C_{A,CLS}\right) + \sum_{i=1}^{5}\left(\frac{1}{w_{A,i}} \times C_{A,i}\right) \quad (10A)$$

-continued $$C_{A,2} = \left(\frac{1}{w_{B,CLS}} \times C_{B,CLS}\right) + \sum_{i=1}^{5}\left(\frac{1}{w_{A,i}} \times C_{A,i}\right) \quad (10B)$$

and the final confidence values for the second type of sensor's rectified-preliminary detection results are measured as:

$$C_{B,1} = \left(\frac{1}{w_{B,CLS}} \times C_{B,CLS}\right) + \sum_{i=1}^{5}\left(\frac{1}{w_{B,i}} \times C_{B,i}\right) \quad (11A)$$

$$C_{B,2} = \left(\frac{1}{w_{A,CLS}} \times C_{A,CLS}\right) + \sum_{i=1}^{5}\left(\frac{1}{w_{B,i}} \times C_{B,i}\right) \quad (11B)$$

if $C_{A,1}+C_{B,1}>C_{A,2}+C_{B,2}$, then the class from the firs type of sensor's classifier is used; otherwise, class from the second type of sensor's classifier is used. After that, the process would proceed to case 1.

For case 3, if one of the classifiers has no recognition function ($C_{A,CLS}|C_{B,CLS}=0$), then the final confidence values for the first type of sensor's rectified-preliminary detection results is measured as:

$$C_A = \sum_{i=1}^{5}\left(\frac{1}{w_{A,i}} \times C_{A,i}\right) \quad (12)$$

and the final confidence values for the second type of sensor's rectified-preliminary detection results is measured as:

$$C_B = \sum_{i=1}^{5}\left(\frac{1}{w_{B,i}} \times C_{B,i}\right) \quad (13)$$

if $C_A>C_B$, then the detection from first type of sensor's classifier would be kept; otherwise, the detection from the second type of sensor's classifier would be kept.

Figure 9:
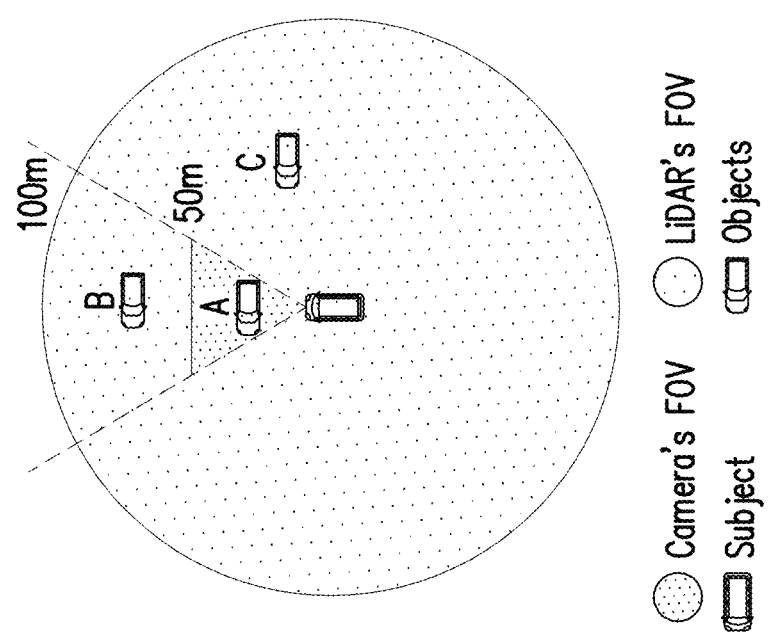
FIG. 9 illustrates the FOVs of sensor candidates to be used by an autonomous vehicle as well as each possible detection cases in accordance with one of the exemplary embodiments of the disclosure.

FIG. 9 illustrates the FOVs of sensor candidates to be used by an autonomous vehicle as well as each possible detection cases in accordance with one of the exemplary embodiments of the disclosure. Referring to Table 2 which describes predefined constants of the proposed framework below, to increase the clarity of the proposed framework, the rest of this section will briefly discuss the performance of the proposed framework as well as few exemplary demonstrations of the proposed object detection framework. In an experiment, the proposed framework was implemented by using two 16-beams LiDAR, one 32-beams LiDAR, and one RGB camera.

TABLE 2

| Predefined Constants | Value | Predefined Constants | Value |
|---|---|---|---|
| α | 0.8 | θ | 0.3 |
| β | 0.7 | φ | 0.6 |
| γ | 0.9 | $w_i$ | 5 |
| $w_{A,i} = w_{B,i}$ | 6 | $w_{A,CLS} = w_{B,CLS}$ | 6 |

Based on these experimental setup, a performance assessment was conducted mainly on 976 frames which are acquired from the overlapping field of view. The true positive rate (TPR), precision (PPV), accuracy (ACC), and harmonic mean of precision and accuracy ($F_1$) were measured and presented in Table 3 which shows Quantitative Observation of the Proposed Framework below.

TABLE 3

| Metric | LiDAR-based (SVM) | Camera-based (YOLO) | Decision Fusion |
|---|---|---|---|
| TPR | 0.400 | 0.894 | 0.918 |
| PPV | 0.905 | 0.965 | 0.999 |
| ACC | 0.385 | 0.872 | 0.918 |
| $F_1$ | 0.554 | 0.928 | 0.957 |

According to Table 3, the proposed framework is shown to be able to enhance the performance of various object detection algorithms substantially especially when compared to the LiDAR-based detection algorithm. In addition, the computational cost for the proposed framework is considered as efficient that is 43.227 ms in an Intel i7 with 4G of RAM. To emphasize on the contributions from the proposed framework, the following elaborations as shown in FIG. 10A~FIG. 12B describe the scenarios as shown in FIG. 9.

In a first example which corresponds to FIG. 10A~FIG. 10B, suppose that there are the following rectified-preliminary detection results as shown in Table 4 below.

TABLE 4

| ID | x | y | w | h | MOD | CLS |
|---|---|---|---|---|---|---|
| 0 | 546 | 354 | 101 | 103 | camera | 3 |
| 1 | 549 | 364 | 165 | 104 | LiDAR | 3 |
| 2 | 120 | 373 | 68 | 44 | camera | 3 |

In Table 4 as subsequent tables, the x and y values denote the coordinate of the top-left corner of the corresponding 2D bounding box in Cartesian system. The w and h denote the width and height of the corresponding 2D bounding box in pixel units (i.e. Cartesian), respectively. The MOD represents the modality of sensor, by which the corresponding bounding box is produced (e.g. either from camera or from LiDAR). The CLS represents the class index of the corresponding bounding box. In this and subsequent exemplary embodiments, the object detection algorithms from either camera-based or LiDAR-based could demarcate detected objects into four or more classes where "0" stands for pedestrian objects, "1" stands for scooter objects, "2" stands for car objects, and "3" stands for truck objects.

Figure 10A:
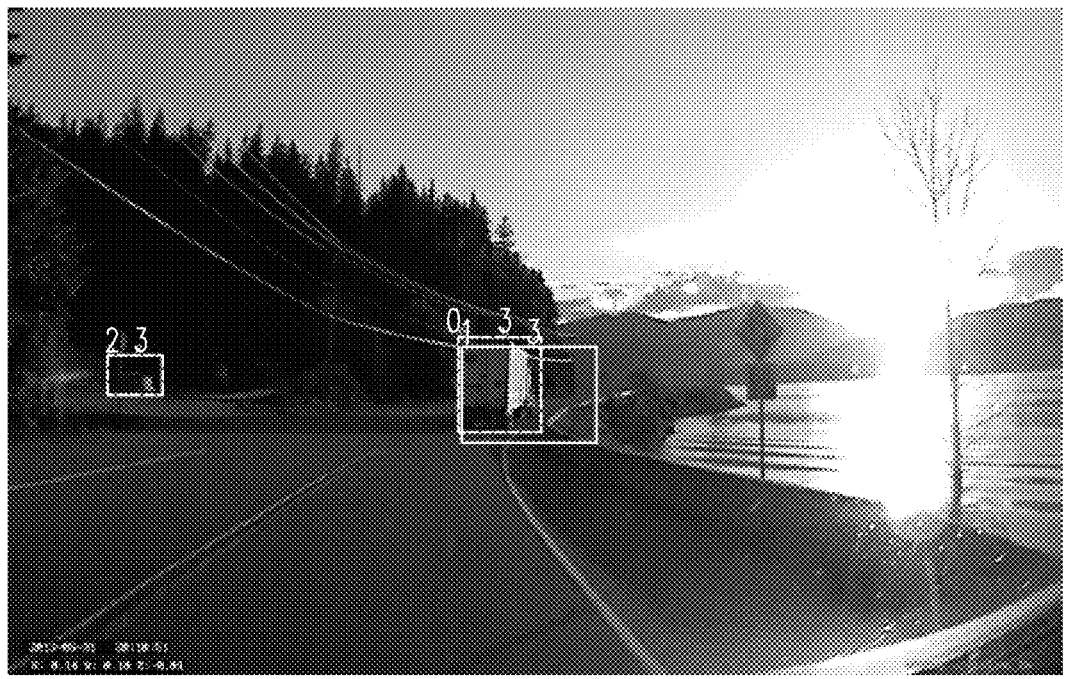
FIG. 10A~FIG. 10B illustrates a first implementation example of the object detection method in accordance with one of the exemplary embodiments of the disclosure.
Figure 10B:
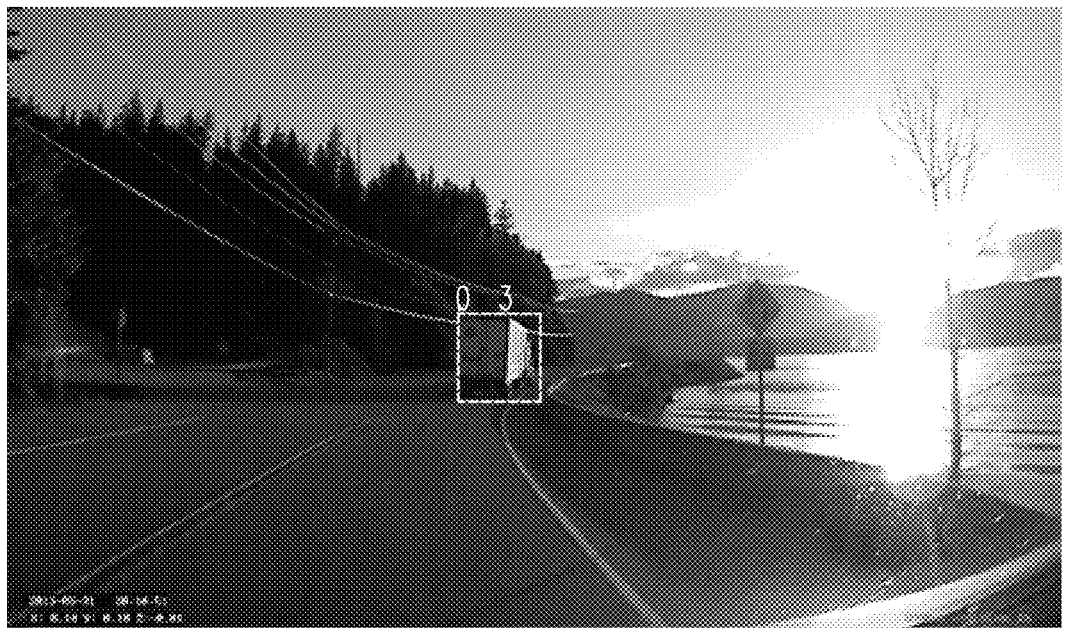

As shown in FIG. 10A, after overlapping-cluttering analysis, it had been known that bounding boxes ID=0 and ID=1 were sent to the Dempster-Shafer module and bounding box ID=2 was sent to the parameter filter module. Consequently, since bounding box ID=2 had been sent to the parameter filter; a pseudo bounding box ID=2' was created with similar specifications and constraints of bounding box ID=2 but with the complementing modality (MOD). From the image, it can be seen that the environmental conditions of FIG. 10A includes high lux and mid local intensities, good weather, and some presences of under-exposures and over-exposures. Therefore, the environment-based constrains were calculated for each bounding box as Table 5 shown below.

TABLE 5

| ID | I | W/L | O | U | D |
|---|---|---|---|---|---|
| 0 | 0.989 | 1/1 | 0.327 | 0.310 | 0.321 |
| 1 | 0.837 | 1/1 | 0.751 | 0.000 | 0.327 |
| 2 | 0.325 | 1/1 | 0.000 | 0.000 | 0.421 |
| 2' | 0.325 | 1/1 | 0.000 | 0.000 | 0.421 |

These constraints are then normalized and processed to find the final confidence value of each bounding box as shown in Table 6 below.

TABLE 6

| ID | $C_1$ | $C_2$ | $C_3$ | $C_4$ | $C_5$ | $C_{CLS}$ | C |
|---|---|---|---|---|---|---|---|
| 0 | 0.993 | 1.000 | 0.988 | 0.984 | 0.911 | 0.900 | 0.962 |
| 1 | 0.012 | 1.000 | 0.986 | 0.996 | 0.800 | 0.900 | 0.782 |
| 2 | 0.238 | 1.000 | 0.893 | 0.838 | 0.375 | 0.500 | 0.334 |
| 2' | 0.761 | 1.000 | 1.000 | 0.914 | 0.800 | 0.500 | 0.447 |

According to the above data, the bounding box ID=0 was preserved, while bounding box ID=1 was eliminated. For bounding box ID=2 that was sent to the parameter filter was not preserved since the final confidence did favor the pseudo-version of the bounding box. The results can be seen in FIG. 10B.

In a second example, suppose that there are the following preliminary detection results as shown in Table 7 below:

TABLE 7

| ID | x | y | w | h | Mod | CLS |
|---|---|---|---|---|---|---|
| 0 | 351 | 396 | 110 | 81 | camera | 2 |
| 1 | 354 | 396 | 113 | 89 | LiDAR | 3 |
| 2 | 541 | 396 | 74 | 98 | LiDAR | 3 |

Figure 11A:
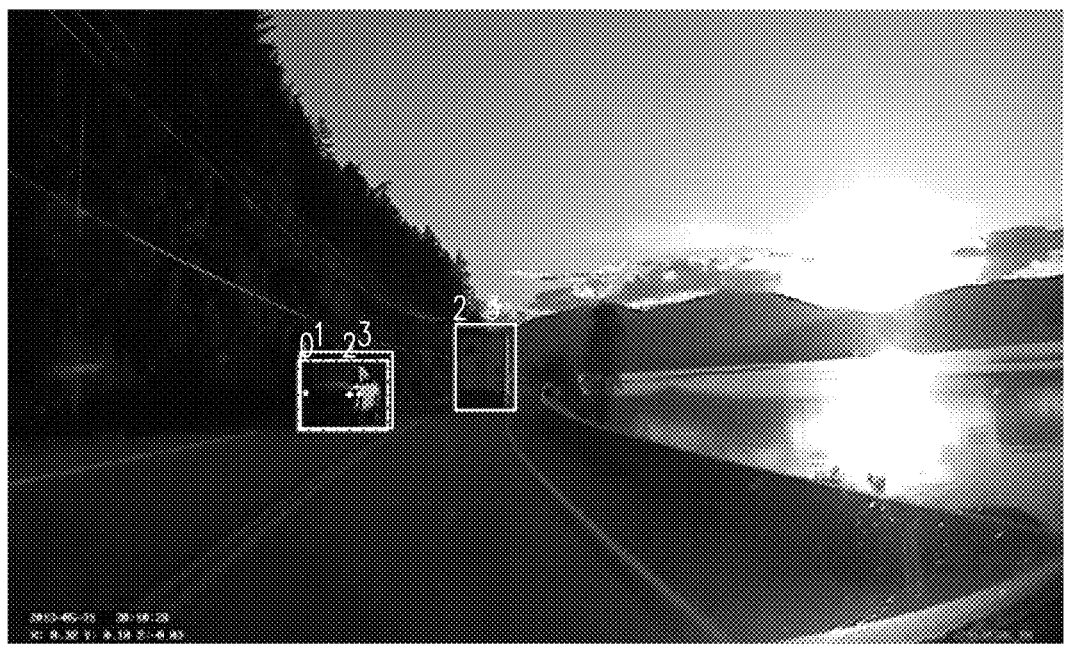
FIG. 11A~FIG. 11B illustrates a second implementation example of the object detection method in accordance with one of the exemplary embodiments of the disclosure.
Figure 11B:
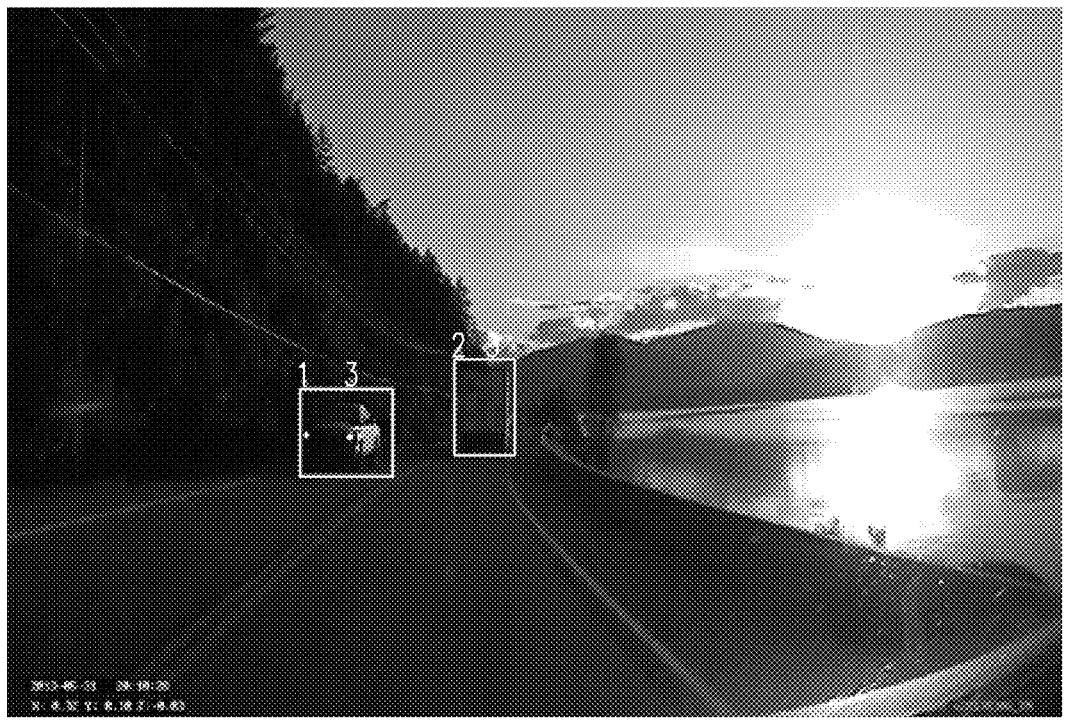

As shown in FIG. 11A, after overlapping-cluttering analysis, it had been known that bounding boxes ID=0 and ID=1 were sent to the Dempster-Shafer module and bounding box ID=2 was sent to the parameter filter module. Consequently, since bounding box ID=2 had been sent to the parameter filter; a pseudo bounding box ID=2' was created with similar specifications and constraints of bounding box ID=2 but with the complementing modality (MOD). From the image, it can be seen that the environment conditions of FIG. 11A would include high lux and mid local intensities, good weather, and some presences of under-exposures and over-exposures. Therefore, the environment-based constrains were calculated for each bounding box as shown in Table 8 below.

TABLE 8

| ID | I | W/L | O | U | D |
|---|---|---|---|---|---|
| 0 | 0.090 | 1/1 | 0.000 | 0.302 | 0.332 |
| 1 | 0.090 | 1/1 | 0.000 | 0.000 | 0.351 |
| 2 | 0.090 | 1/1 | 0.000 | 0.000 | 0.411 |
| 2' | 0.090 | 1/1 | 0.000 | 0.829 | 0.411 |

These constraints are then normalized and processed to find the final confidence value of each BB as shown in Table 9 below.

TABLE 9

| ID | $C_1$ | $C_2$ | $C_3$ | $C_4$ | $C_5$ | $C_{CLS}$ | C |
|---|---|---|---|---|---|---|---|
| 0 | 0.006 | 1.000 | 0.946 | 0.976 | 0.561 | 0.900 | 0.731 |
| 1 | 0.993 | 1.000 | 1.000 | 0.991 | 0.800 | 0.900 | 0.947 |
| 2 | 0.993 | 1.000 | 0.800 | 0.935 | 0.800 | 0.800 | 0.756 |
| 2' | 0.006 | 1.000 | 0.982 | 0.854 | 0.876 | 0.200 | 0.148 |

According to the above data, the bounding box ID=1 was preserved, while bounding box ID=0 was eliminated. For bounding box ID=2 that was sent to the parameter filter was preserved since the final confidence did not favor the pseudo-version of the bounding box. The results can be seen in FIG. 11B.

In a third a third example, suppose that suppose that there are the following rectified-preliminary detection results as shown in Table 10 below.

TABLE 10

| ID | x | y | w | h | MOD | CLS |
|---|---|---|---|---|---|---|
| 0 | 692 | 339 | 25 | 26 | LiDAR | 2 |

Figure 12A:
FIG. 12A~FIG. 12B illustrates a third implementation example of the object detection method in accordance with one of the exemplary embodiments of the disclosure.
Figure 12B:

As seen in FIG. 12A, after overlapping-cluttering analysis, it had been known that bounding box ID=0 was sent to the parameter filter module. Consequently, since bounding box ID=0 had been sent to the parameter filter; a pseudo bounding box ID=0' was created with similar specifications and constraints of bounding box ID=0 but with the complementing modality (MOD). From the image, it can be seen that the environment condition of FIG. 12A would include high lux and mid local intensities, good weather, and some presences of over-exposures. Therefore, the environment-based constrains were calculated for each bounding box as shown in Table 11 below.

TABLE 11

| ID | I | W/L | O | U | D |
|---|---|---|---|---|---|
| 0 | 0.372 | 1/1 | 0.000 | 0.000 | 0.627 |
| 0' | 0.372 | 1/1 | 0.000 | 0.000 | 0.627 |

These constraints are then normalized and processed to find the final confidence value of each bounding box as shown in Table 12.

TABLE 12

| ID | $C_1$ | $C_2$ | $C_3$ | $C_4$ | $C_5$ | $C_{CLS}$ | C |
|---|---|---|---|---|---|---|---|
| 0 | 0.365 | 1.000 | 1.000 | 0.750 | 0.890 | 0.700 | 0.560 |
| 0' | 0.634 | 1.000 | 1.000 | 0.074 | 0.800 | 0.300 | 0.210 |

According to the above data, the bounding box ID=0 that was sent to the parameter filter was preserved since the final confidence did not favor the pseudo-version of the bounding box. The results can be seen in FIG. 12B.

In view of the aforementioned descriptions, the disclosure provides an object detection system that is suitable for being used in an autonomous vehicle. Specifically, the purposes of the disclosure may include: improving the detection rate of classifiers from each sensor by using the provided decision fusion, designing the provided decision fusion by considering each sensor's characteristics and behaviors, and providing final detection results that includes bounding box locations (in pixels and in meters), object classes, and detection confidences. In this way, the accuracy of the object detections can be improved.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An object detection system comprising:
a first type of sensor for generating a first sensor data;
a second type of sensor for generating a second sensor data; and
a processor coupled to the first type of sensor and the second type of sensor and configured at least for:
processing the first sensor data by using a first plurality of object detection algorithms to generate first preliminary detection results which correspond to the first type of sensor;
processing the second sensor data by using a second plurality of object detection algorithms to generate second preliminary detection results which correspond to the second type of sensor;
applying a parameter detection algorithm which comprises a plurality of environmental parameters for each of the first preliminary detection results and the second preliminary detection results to generate a plurality of confidence values with each confidence value corresponding to a different environmental parameter of the plurality of environmental parameters, wherein the plurality of confidence values are generated according to the first sensor data and the second sensor data; and
determining a detected object based on characteristics of the first type of sensor, characteristics of the second type of sensor, relationships among the first preliminary detection results and the second preliminary detection results, and the plurality of confidence values, comprising:
determining the detected object from multiple bounding boxes according to the plurality of confidence values, wherein the plurality of confidence values are corresponded to the multiple bounding boxes respectively, wherein the processor is further configured for:
fusing the first preliminary detection results and the second preliminary detection results to generate a fused preliminary detection results;

paring two bounding boxes; and
performing an overlap and clutter analysis from the fused preliminary detection results by determining whether two bounding boxes are overlapping above a predetermined overlapping threshold and are separated above a predetermined distance threshold,
wherein the paired bounding boxes are determined as being either independent or dependent based on at least a spatial distance between the paired bounding boxes, depth information of the bounding boxes, and detected classes of the bounding boxes.

2. The object detection system of claim 1, wherein the processor is further configured for:
using a Dempster-Shafer module when both the predetermined overlapping threshold and the predetermined distance threshold are exceeded.

3. The object detection system of claim 1, wherein the processor is further configured for:
using a parameter filtering module when one of the predetermined overlapping threshold and the predetermined distance threshold are not exceeded.

4. The object detection system of claim 2, wherein the processor is further configured for:
preserving a first bounding box which is determined as being more reliable of the paired bounding boxes and discarding the other bounding box of the pair bounding boxes based on at least the plurality of confidence values.

5. The object detection system of claim 3, wherein the processor is further configured for:
determining a pseudo bounding box; and
determining whether each bounding box from the fused preliminary detection results is preserved or removed based on at least the plurality of confidence values.

6. The object detection system of claim 1, wherein the plurality of environmental parameters comprises at least one of a weather condition, a local intensity measurement, an over-exposure detection, an under-exposure detection, relative distance of an object, angular position of the object, and a confidence of the object corresponding to an object detection algorithm.

7. The object detection system of claim 6, wherein the plurality of environmental parameters are normalized to conform to the ranges of the first type of sensor and the second type of sensor.

8. The object detection system of claim 1, wherein the first type of sensor comprises a RaDAR sensor, and the second type of sensor comprises a camera.

9. An autonomous vehicle comprising:
an object detection system comprising:
a first type of sensor for generating a first sensor data;
a second type of sensor for generating a second sensor data; and
a processor coupled to the first type of sensor and the second type of sensor and configured at least for:
processing the first sensor data by using a first plurality of object detection algorithms to generate first preliminary detection results which correspond to the first type of sensor;
processing the second sensor data by using a second plurality of object detection algorithms to generate second preliminary detection results which correspond to the second type of sensor;
applying a parameter detection algorithm which comprises a plurality of environmental parameters for each of the first preliminary detection results and the second preliminary detection results to generate a plurality of confidence values with each confidence value corresponding to a different environmental parameter of the plurality of environmental parameters, wherein the plurality of confidence values are generated according to the first sensor data and the second sensor data; and determining a detected object based on characteristics of the first type of sensor, characteristics of the second type of sensor, relationships among the first preliminary detection results and the second preliminary detection results, and the plurality of confident values, comprising:

determining the detected object from multiple bounding boxes according to the plurality of confidence values, wherein the plurality of confidence values are corresponded to the multiple bounding boxes respectively, wherein the processor is further configured for:

fusing the first preliminary detection results and the second preliminary detection results to generate a fused preliminary detection results;

paring two bounding boxes; and performing an overlap and clutter analysis from the fused preliminary detection results by determining whether two bounding boxes are overlapping above a predetermined overlapping threshold and are separated above a predetermined distance threshold, wherein the paired bounding boxes are determined as being either independent or dependent based on at least a spatial distance between the paired bounding boxes, depth information of the bounding boxes, and detected classes of the bounding boxes.

10. An object detection method used by an autonomous vehicle, the method comprising:

generating, by using a first type of sensor, a first sensor data;

generating, by using a second type of sensor, a second sensor data;

processing the first sensor data by using a first plurality of object detection algorithms to generate first preliminary detection results which correspond to the first type of sensor;

processing the second sensor data by using a second plurality of object detection algorithms to generate second preliminary detection results which correspond to the second type of sensor;

applying a parameter detection algorithm which comprises a plurality of environmental parameters for each of the first preliminary detection results and the second preliminary detection results to generate a plurality of confidence values with each confidence value corresponding to a different environmental parameter of the plurality of environmental parameters, wherein the plurality of confidence values are generated according to the first sensor data and the second sensor data; and determining a detected object based on characteristics of the first type of sensor, characteristics of the second type of sensor, relationships among the first preliminary detection results and the second preliminary detection results, and the plurality of confident values, comprising:

determining the detected object from multiple bounding boxes according to the plurality of confidence values, wherein the plurality of confidence values are corresponded to the multiple bounding boxes respectively, the object detection method further comprising:

fusing the first preliminary detection results and the second detection results to generate a fused preliminary detection results;

paring two bounding boxes; and performing an overlap and clutter analysis from the fused preliminary detection results by determining whether two bounding boxes are overlapping above a predetermined overlapping threshold and are separated above a predetermined distance threshold, wherein the paired bounding boxes are determined as being either independent or dependent based on at least a spatial distance between the paired bounding boxes, depth information of the bounding boxes, and detected classes of the bounding boxes.

11. The object detection method of claim 10 further comprising:

using a Dempster-Shafer module when both the predetermined overlapping threshold and the predetermined distance threshold are exceeded.

12. The object detection method of claim 10 further comprising:

using a parameter filtering module when one of the predetermined overlapping threshold and the predetermined distance threshold are not exceeded.

13. The object detection method of claim 11 further comprising:

preserving a first bounding box which is determined as being more reliable of the paired bounding boxes and discarding the other bounding box of the pair bounding boxes based on at least the plurality of confidence values.

14. The object detection method of claim 12 further comprising:

determining a pseudo bounding box; and determining whether each bounding box from the fused preliminary detection results is preserved or removed based on at least the plurality of confidence values.

15. The object detection method of claim 10, wherein the plurality of environmental parameters comprises at least one of a weather condition, a local intensity measurement, an over-exposure detection, an under-exposure detection, relative distance of an object, angular position of the object, and a confidence of the object corresponding to an object detection algorithm.

16. The object detection method of claim 15, wherein the plurality of environmental parameters are normalized to conform to the ranges of the first type of sensor and the second type of sensor.

* * * * *